United States Patent Office 3,538,063
Patented Nov. 3, 1970

3,538,063
CURING OF POLYMERCAPTAN POLYMERS
Earl H. Sorg, Trenton, N.J., and Julian R. Panek, Newtown, Pa., assignors to Thiokol Chemical Corporation, Bristol, Pa., a corporation of Pennsylvania
No Drawing. Filed Aug. 16, 1967, Ser. No. 660,941
Int. Cl. C08g 23/00
U.S. Cl. 260—79
2 Claims

ABSTRACT OF THE DISCLOSURE

Polymercaptan-containing polymers are cured with lithium peroxide to yield vulcanizates having improved resistance to heat aging.

BACKGROUND OF THE INVENTION

Though various polymercaptan-containing polymers are known in the art, such as, mercaptan-terminated polymers of conjugated dienes, polysulfide polymers having mercaptan functionality have been the most widely used over many years. Such polymers and methods of making them are disclosed in, for example, U.S. Pats. 1,890,191; 2,206,641; 2,206,642; 2,206,643; 2,216,044; 2,221,650; 2,235,621; 2,255,228; 2,278,127 and 2,278,128. In general these polymers are prepared by reacting polyfunctional organic compounds with alkali metal or alkaline earth metal sulfide solutions to produce high molecular weight polymers having the recurring unit (RSS), wherein R is usually a divalent organic radical that may vary widely in its specific structure as disclosed in the patents referred to above, and SS represents a disulfide linkage through which the organic radicals are interconnected. In order to improve the properties of the polymers, it is customary to use a mixture of difunctional and trifunctional organic compounds wherein the trifunctional compound is present in a relatively small amount to produce a slightly cross-linked structure.

Although the organic radicals represented by the symbol R above may vary considerably in their specific structure, the commercially important polymers are usually made from certain aliphatic halides, e.g., alkylene chlorides such as ethylene dichloride and its homologues or oxygen-containing aliphatic dichlorides such as bis-beta-chloroethyl formal. Thus most of the commercial polymers are primarily composed of relatively short chain divalent alkylene and/or oxahydrocarbon radicals interconnected by disulfide groups.

The present invention is particularly concerned with liquid polysulfide polymers which can be obtained from the high molecular weight polymers referred to above by a splitting process described in U.S. Pat. 2,466,963. As disclosed in this patent, the high molecular weight polymers can be split to form polythiopolymercaptan polymers having molecular weights of the order of 500 to 25,000 and which are viscous liquids having viscosities within the range of 300 to 100,000 centipoises. The commercially important liquid polymers of this type are particularly described in articles by Fettes and Jorczak published in "Industrial and Engineering Chemistry," vol. 42, page 2217 (1950) and vol. 43, page 324 (1951). As pointed out in these articles, the commercially available liquid polymers are generally prepared from bis-beta-chlorethyl formal and are essentially composed of recurring

(S·CH₂·CH₂·O·CH₂·O·CH₂·CH₂·S)

groups and have free mercapto terminals through which they may be cured to form a solid elastomer.

Such liquid polymers can be cured by any of various curing agents such as those disclosed in U.S. Pat. 2,466,963 to form solid elastomers having excellent resistance to acids, alkalis, petroleum hydrocarbons and atmospheric oxidation. With the curing agents, e.g., lead peroxide, most commonly used, however, it has been found that the heat aging characteristics of the cured polymer are not altogether satisfactory. After being exposed to temperatures of 150° to 200° F. for several days, the cured polymer tends to lose its flexibility as evidenced by a substantial increase in hardness and a substantial decrease in percentage elongation. In sealant and rubber coating applications this frequently results in service failure of the compositions due to inadequate physical and adhesive characteristics.

SUMMARY OF THE INVENTION

It is, therefore, an object of the present invention to provide a method of curing a polymercaptan-containg polymer to produce a vulcanizate having improved heat aging stability. This and other objects are accomplished in accordance with the present invention by curing such polymers with lithium peroxide. More particularly, the present invention provides a method of curing a polymercaptan-containing polymer to form a vulcanizate haviing improved heat aging resistance which comprises (a) mixing a liquid polymercaptan polymer with a sufficient amount of lithium peroxide to cure said polymer and (b) causing said peroxide to cure said liquid polymer to a solid elastomer.

By utilizing lithium peroxide as the curing agent for liquid polymercaptan polymers, it is possible to prepare vulcanizates which retain excellent physical properties over prolonged periods at elevated temperatures. When applied as sealants and coatings, the material upon curing remains flexible and strongly adherent to various substrates including glass and metal even when applied in fairly thick section. Also, the use of lithium peroxide as the curing agent allows the preparation of a white or pastel-colored vulcanizate which is highly desirable in certain sealant and coating applications and which has not been possible to achieve with many previous curing agents due to discoloration of the cured coating.

DESCRIPTION OF THE PREFERRED EMBODIMENTS

As indicated above, the persent invention is particularly concerned with curing liquid polysulfide polymers as preprepared in U.S. Pat. 2,466,963. However, other curable polymercaptan polymers, i.e., polymers containing a plurality of —SH groups may be cured in accordance with the method of this invention including:

(A) liquid polysulfide polymers containing a plurality of —SSH groups such as described in U.S. S.N. 290-637 filed June 26, 1963, now abandoned;

(B) liquid —SH terminated polyethers such as —SH terminated polypropylene glycol as disclosed in U.S. Pat. 3,258,495;

(C) —SH terminated hydrocarbon polymers such as —SH terminated polybutadiene (Chem. and Eng. News, Apr. 4, 19666, p. 37), —SH terminated butadiene/acrylonitrile copolymers and the alkanepolythiol, aralkanepolythio, and arenepolythiol polymers disclosed in U.S. Pats. 2,230,390; 2,436,137 and 3,243,411;

(D) liquid —SH terminated polyurethanes such as are disclosed in U.S. patent application S.N. 484,097 filed Aug. 31, 1965, now Pat. No. 3,446,780;

(E) liquid —SH terminated poly(alkylene sulfide) polymers as are disclosed in U.S. Pats. 3,056,841 and 3,070,580;

(F) other polythiol polymers such as are disclosed in U.S. patent application 484,105, filed Aug. 31, 1965. now Pat. No. 3,413,265.

The —SH containing polymers, according to the present invention, may be used singularly or in various combinations with one another.

The lithium peroxide used may be either the pure compound or any of various commercial products which are substantially free from impurities. The particle size may vary widely, and the size of the material used will depend upon, among other things, the curing temperature, the presence of moisture and the cure rate desired. In terms of surface area measurements the material employed ordinarily has a surface area ranging between about 0.2 and 17 square meters per gram. Material having a higher surface area is generally employed for obtaining rapid cures at room temperature under relatively dry conditions. However, practical cure rates may be obtained at room temperature with small surface area material, i.e., larger particle size material in the presence of high humidity or with the addition of small amounts of water.

In general the curing procedure employed is similar to that previously used for curing liquid polysulfide polymers with curing agents such as lead peroxide. The lithium peroxide and, if desired, various ancillary materials such as fillers, pigments, reinforcing agents, buffers and the like are intimately admixed with polymer in any suitable mixing device such as a paint mill and after application as a coating or otherwise, the composition is allowed to cure at room or at elevated temperatures. Ordinarily, the curing temperature may range up to about 300° F.

The quantity of lithium peroxide employed in carrying out the present method may vary widely and will depend upon the particular polymer and curing conditions. For achieving the benefits of the present invention, the minimum amount will be that quantity necessary to provide a cure under the conditions used. Generally, the quantity used ranges between about 0.5 and 10.0 parts by weight as based on 100 parts by weight of polymer.

The following examples are given to illustrate the present invention more clearly and are not intended as a limitation upon the scope thereof.

EXAMPLES 1 AND 2

Ingredients: Parts by weight
Liquid polysulfide polymer [1] _____ 100
Titanium dioxide pigment _____ 10
Calcium carbonate filler _____ 30
Silica thickener _____ 3
Calcium stearate—curing regulator _____ 1
Stearic acid—curing regulator _____ 1
Sulfur—crosslinking agent _____ 0.1
Chlorinated hydrocarbon plasticizer _____ 5.0
Phenolic resin adhesion promoter _____ 5.0

[1] The polysulfide polymer had essentially the structure
$HS(C_2H_4-O-CH_2-O-C_2H_4S-S)_{23}C_2H_4-O-CH_2-O-C_2H_4-SH$
with about 0.5% cross-linking or branching by trichloropropane and an average molecular weight of about 4000.

In these examples two batches of composition each containing the ingredients set forth above were prepared by milling together on a paint mill the polysulfide polymer together with the adjuvants until a uniform and intimate admixture was obtained. To one batch of formulation, designated Example 1, was added 15 parts by weight of a conventional curing paste composed of about 10 parts by weight of lead peroxide and about 5 parts by weight of chlorinated hydrocarbon plasticizer. To the other batch of formulation, designated Example 2, was added 10 parts by weight of commercial lithium peroxide.

After the peroxide curing agents were thoroughly blended into the respective compositions, the compositions were allowed to cure for 1 week at about 158° F. and then pressed into two test sheets at a temperature between about 280° and 300° F. Dumbbell-shaped specimens were cut from one sheet and the other sheet was heat aged at 250° F. for 1 week after which time further dumbbell-shaped specimens were cut for testing elongation characteristics and Shore "A" hardness. The results of these tests are given in Table I below.

TABLE I

| Properties | Ex. 1 (PbO₂) | Ex. 2 (Li₂O₂) |
|---|---|---|
| Initial: | | |
| Percent elogation | 900 | 840 |
| Shore "A" hardness [1] | 26 | 53 |
| Aged at 250° F: | | |
| Percent elogation | 170 | 410 |
| Shore "A" hardness [1] | 62 | 68 |

[1] Reported in durometer degrees.

From the results obtained, it is readily apparent that the composition of Example 2 retained about 50% of its elongation over the initial value as compared to only about 20% retention of original percent elongation for the composition of Example 1 cured with a conventional lead peroxide paste. The hardness of the lithium peroxide cured composition increased less than 30% whereas the hardness of the conventionally cured composition of Example 1 increased more than two times. Also, the cured composition of Example 2 was light colored while the cured composition of Example 1 was relatively dark brown.

EXAMPLES 3–7

Ingredients: Parts by weight
Liquid polysulfide polymer _____ 100
Carbon black filler _____ 50
Silica thickener _____ 5

Five batches of the above formulation were prepared in the same manner as described for Examples 1 and 2 above. The polysulfide polymer used was the same as that employed in the previous examples.

Lithium peroxide was added to each batch of composition as the curing agent in the amounts set forth in Table II below. The resulting compositions, except for Example 3 were allowed to cure for 1 week at room temperature (75° F.±2° F.) and about 50% relative humidity and then pressed into three sheets at 280° to 300° F. Example 3 was cured for three days at about 100° F. and 100% relative humidity. Dumbbell-shaped specimens were cut from one sheet for testing before heat aging and the remaining two sheets were aged for 1 week at 158° F. and for 1 week at 212° F., respectively. Dumbbell specimens were then cut from the aged samples and the physical properties thereof determined and compared to those obtained for the unaged specimens cut initially after curing. The results obtained are given in Table II below.

TABLE II

| Example No. | 3 | 4 | 5 | 6 | 7 |
|---|---|---|---|---|---|
| Li₂O₂ (parts by weight) | 0.5 | 1.0 | 2.5 | 5.0 | 10.0 |
| Properties, intiial: | | | | | |
| Shore "A" hardness | 58 | 60 | 57 | 57 | 59 |
| Modulus, 100%, p.s.i | 180 | 160 | 150 | 190 | 150 |
| Modulus, 300%, p.s.i | 360 | 330 | 340 | 280 | 310 |
| Tensile strength, p.s.i | 790 | 700 | 830 | 730 | 700 |
| Elongation, percent | 640 | 660 | 840 | 620 | 750 |
| Properties, aged at 158° F.: | | | | | |
| Shore "A" hardness | 58 | 58 | 60 | 65 | 65 |
| Modulus, 100%, p.s.i | 180 | 200 | 180 | 220 | 220 |
| Modulus, 300%, p.s.i | 360 | 480 | 370 | 510 | 460 |
| Tensile strength, p.s.i | 840 | 980 | 830 | 810 | 710 |
| Elongation, percent | 750 | 680 | 700 | 570 | 600 |
| Properties, aged at 212° F.: | | | | | |
| Shore "A" hardness | 58 | 60 | 64 | 65 | 65 |
| Modulus, 100%, p.s.i | 140 | 200 | 380 | 180 | 150 |
| Modulus, 300%, p.s.i | 350 | 530 | 380 | 390 | 280 |
| Tensile strength, p.s.i | 810 | 800 | 750 | 770 | 560 |
| Elongation, percent | 690 | 500 | 620 | 660 | 730 |

The foregoing data show that the cured compositions exhibited excellent heat aging stability. In all cases the hardness did not increase appreciably, and elongation characteristics were well retained at the various levels of curing agent even after aging at 212° F. for several days. Likewise, tensile strength and modulus were retained with some samples showing improvement after aging.

We claim:

1. A cured polymercaptan polymer characterized by heat aging stability and produced by (a) mixing a liquid polymercaptan polymer with an amount of lithium peroxide in the range of from about 0.5 to 10 parts by weight per 100 parts by weight of the liquid polymercaptan polymer, and (b) causing the lithium peroxide to cure the liquid polymer to a solid elastomer.

2. A cured polymercaptan polymer according to claim 1, in which the liquid polymer is a polythiomercaptan polymer having a molecular weight in the range of from about 500 to about 25,000.

References Cited

UNITED STATES PATENTS

| | | | |
|---|---|---|---|
| 3,225,017 | 12/1965 | Seegman et al. | 260—79.1 |
| 3,402,155 | 9/1968 | Kutch | 260—79 |

DONALD E. CZAJA, Primary Examiner

M. I. MARQUIS, Assistant Examiner

U.S. Cl. X.R.

260—18, 33.8, 37, 45.7, 77.5, 79.1